US010530996B2

(12) United States Patent
Liu et al.

(10) Patent No.: US 10,530,996 B2
(45) Date of Patent: Jan. 7, 2020

(54) ELECTRONIC DEVICE

(71) Applicant: REALTEK SEMICONDUCTOR CORPORATION, Hsinchu (TW)

(72) Inventors: Kai Liu, Taipei (TW); Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/020,016

(22) Filed: Jun. 27, 2018

(65) Prior Publication Data

US 2019/0057490 A1 Feb. 21, 2019

(30) Foreign Application Priority Data

Aug. 21, 2017 (TW) .............................. 106128319 A

(51) Int. Cl.
*H04N 5/232* (2006.01)
*G06T 5/00* (2006.01)
(Continued)

(52) U.S. Cl.
CPC ......... *H04N 5/23229* (2013.01); *G06T 5/002* (2013.01); *G06T 5/003* (2013.01); *G06T 5/007* (2013.01); *G06T 5/20* (2013.01); *H04N 5/217* (2013.01); *G06T 2207/10024* (2013.01); *G06T 2207/20012* (2013.01); *G06T 2207/20021* (2013.01); *G06T 2207/20182* (2013.01);
(Continued)

(58) Field of Classification Search
CPC ........... H04N 5/21–217; H04N 5/2173; H04N 5/23229; G06T 5/001–004; G06T 5/20; G06T 2207/20004; G06T 2207/20012; G06T 2207/20182; G06T 2207/20201; G06T 7/20–277
See application file for complete search history.

(56) References Cited

U.S. PATENT DOCUMENTS

2009/0167951 A1* 7/2009 Chiu ..................... H04N 5/21
348/607
2012/0019727 A1* 1/2012 Zhai ..................... H04N 5/145
348/607
(Continued)

OTHER PUBLICATIONS

Taiwan Intellectual Property Office, "Office Action", dated Sep. 17, 2018. Summary of the OA letter: Claims 1-10 are rejected under Taiwan Patent Act §33-2 since the common technique feature shared by the independent claims is disclosed by Reference 1(US 2014/0125815 A1).

*Primary Examiner* — Paul M Berardesca
(74) *Attorney, Agent, or Firm* — WPAT, PC

(57) ABSTRACT

An electronic device comprising a processing unit and a memory that stores a plurality of program instructions. The processing unit executes the program instructions to perform the following steps: (a) storing pixel data of multiple pixels of a picture in the memory, the number of the pixels being greater than the number of pixels in one horizontal line of the picture; (b) performing an integral image operation on the pixel data to obtain integral image data; (c) storing the integral image data in the memory; (d) using the integral image data to calculate a low-frequency component of a target pixel of the picture; and (e) based on the low-frequency component, selectively performing a temporal noise reduction operation on the target pixel.

20 Claims, 6 Drawing Sheets

(51) Int. Cl.
*G06T 5/20* (2006.01)
*H04N 5/217* (2011.01)
(52) U.S. Cl.
CPC .............. *G06T 2207/20201* (2013.01); *G06T 2207/30196* (2013.01)

(56) References Cited

U.S. PATENT DOCUMENTS

| | | |
|---|---|---|
| 2014/0125815 A1 | 5/2014 | Holz |
| 2015/0193948 A1* | 7/2015 | Kawamura .......... A61B 6/5264 382/132 |
| 2016/0227259 A1* | 8/2016 | Brav ................. H04N 5/23206 |
| 2017/0154219 A1* | 6/2017 | Shin .......................... G06T 7/74 |
| 2017/0256037 A1 | 9/2017 | Li et al. |

\* cited by examiner

| original image | | | | |
|---|---|---|---|---|
| 2 | 1 | 0 | 3 | 0 |
| 4 | 5 | 7 | 2 | 2 |
| 5 | 9 | 4 | 0 | 4 |
| 6 | 5 | 7 | 1 | 6 |
| 0 | 1 | 2 | 1 | 8 |

| integral image | | | | |
|---|---|---|---|---|
| 2 | 3 | 3 | 6 | 0 |
| 6 | 12 | 19 | 24 | 26 |
| 11 | 26 | 37 | 42 | 48 |
| 17 | 37 | 55 | 61 | 73 |
| 17 | 38 | 58 | 65 | 85 |

FIG. 4

ELECTRONIC DEVICE

BACKGROUND OF THE INVENTION

1. Field of the Invention

The present invention generally relates to image processing, and, more particularly, to an electronic device that performs noise reduction on images.

2. Description of Related Art

In image processing, temporal noise reduction (TNR) (also known as temporal filtering) and spatial noise reduction (SNR) (also known as spatial filtering) are often used. TNR uses a previous picture, such as a frame or a field, to perform low-pass filtering on a target picture to reduce noise. Compared with SNR in which the details of the image are lost as the image is often blurred, TNR can maintain the details and texture of the image. TNR, however, tends to cause ghosting and dragging when an object in the image moves; therefore, a motion detection mechanism is required to prevent ghosting and dragging for images containing moving objects. In addition, since TNR requires the use of previous image data, a large amount of memory is required. Because the hardware implementation of TNR is so expensive that the storage of previous image data is greatly limited, and the image quality is sometimes even sacrificed to save huge hardware costs by using compression or downsample techniques, which causes poor user experience.

SUMMARY OF THE INVENTION

In view of the issues of the prior art, an object of the present invention is to provide an electronic device and a software-based image processing method to reduce the amount of computation as the processing unit of the electronic device performs image processing, so as to make an improvement to the prior art.

An electronic device is provided. The electronic device includes a memory and a processing unit. The memory is configured to store a plurality of program instructions. The processing unit is coupled to the memory and configured to execute the program instructions to complete following steps while executing a driver: (a) receiving pixel data of a plurality of pixels of a picture from an image capture device through a universal serial bus; (b) storing the pixel data of the pixels in the memory, the number of the pixels being greater than the number of pixels in one horizontal line of the picture; (c) determining a first region and a second region in the picture; (d) determining whether a target pixel is in the first region or the second region; (e) performing steps (e1) to (e4) when the target pixel is in the first region; and (f) performing the temporal noise reduction (TNR) operation on the target pixel when the target pixel is in the second region. Step (e1) to (e4) are as follows: (e1) performing an integral image operation on the pixel data to obtain an integral image data; (e2) storing the integral image data in the memory; (e3) using the integral image data to calculate a low-frequency component of the target pixel of the picture; and (e4) based on the low-frequency component, selectively performing a temporal noise reduction operation on the target pixel.

An electronic device is also provided. The electronic device includes a memory and a processing unit. The memory is configured to store a plurality of program instructions. The processing unit is coupled to the memory and configured to execute the program instructions to complete following steps: (a) storing pixel data of a plurality of pixels of a picture in the memory, the number of the pixels being greater than the number of pixels in one horizontal line of the picture; (b) performing an integral image operation on the pixel data to obtain an integral image data; (c) storing the integral image data in the memory; (d) using the integral image data to calculate a low-frequency component of a target pixel of the picture; and (e) based on the low-frequency component, selectively performing a temporal noise reduction operation on the target pixel.

An electronic device is also provided. The electronic device includes a memory and a processing unit. The memory is configured to store a plurality of program instructions. The processing unit is coupled to the memory and configured to execute the program instructions to complete following steps: (a) storing pixel data of a plurality of pixels of a picture in the memory, the number of the pixels being greater than the number of pixels in one horizontal line of the picture; (b) determining a first region and a second region in the picture, the first region and the second region not overlapping; (c) determining whether a target pixel is in the first region or the second region; (d) based on a low-frequency component of the target pixel, selectively performing a temporal noise reduction operation on the target pixel when the target pixel is in the first region; and (e) performing the temporal noise reduction operation on the target pixel when the target pixel is in the second region.

The electronic device and the software-based image processing method of the present invention employ integral image to reduce the amount of computation of the processing unit in obtaining the low-frequency component of the image. In addition, the present invention can further reduce the amount of computation of the processing unit by dividing the picture into a region of interest and a region of non-interest and selectively performing TNR operations in the region of interest. Compared with the conventional technology, the electronic device and the software-based image processing method of the present invention have the advantages of implementation flexibility and low cost, and the software-based image processing method is easy to be ported to different platforms and facilitates smooth operation of the electronic device.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 4 illustrates the relationship between the original image that contains the original pixel data and the integral image that contains the integral image data.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an electronic device and a software-based image processing method. Some or all of the processes of the software-based image processing method may be implemented by software and/or firmware. A person having ordinary skill in the art can choose components or steps equivalent to those described in this specification to carry out the present invention, which means that the scope of this invention is not limited to the embodiments in the specification.

Because volatile memories (e.g., dynamic random-access memories, DRAMs) in electronic devices are inexpensive, software-based image processing can obtain a wider range of pixel data at a relatively low cost. The greater the range of pixel data, the more reliable the results of image processing. That is, compared to the hardware-based implementation that is limited to the memory cost, software-based temporal noise reduction (TNR) has advantages of implementation flexibility and low cost. Software-based image processing, however, tends to cause a computation burden on the central processing unit (CPU) (the greater the range of pixel data, the greater the CPU burden), and a lower-level (i.e., lower computing power) CPU may easily cause decreases in the frame rate or slow down the operating speed of other programs that are running, making it difficult to port the same image processing mechanism to a platform that employs a different level of CPU. The image processing method proposed by the present invention can reduce the computation burden of the CPU, making the performance of software-based image processing less limited to the CPU's computing power, and also making the electronic device operate more smoothly (e.g., reducing the occurrence of image lag).

Figure 1:
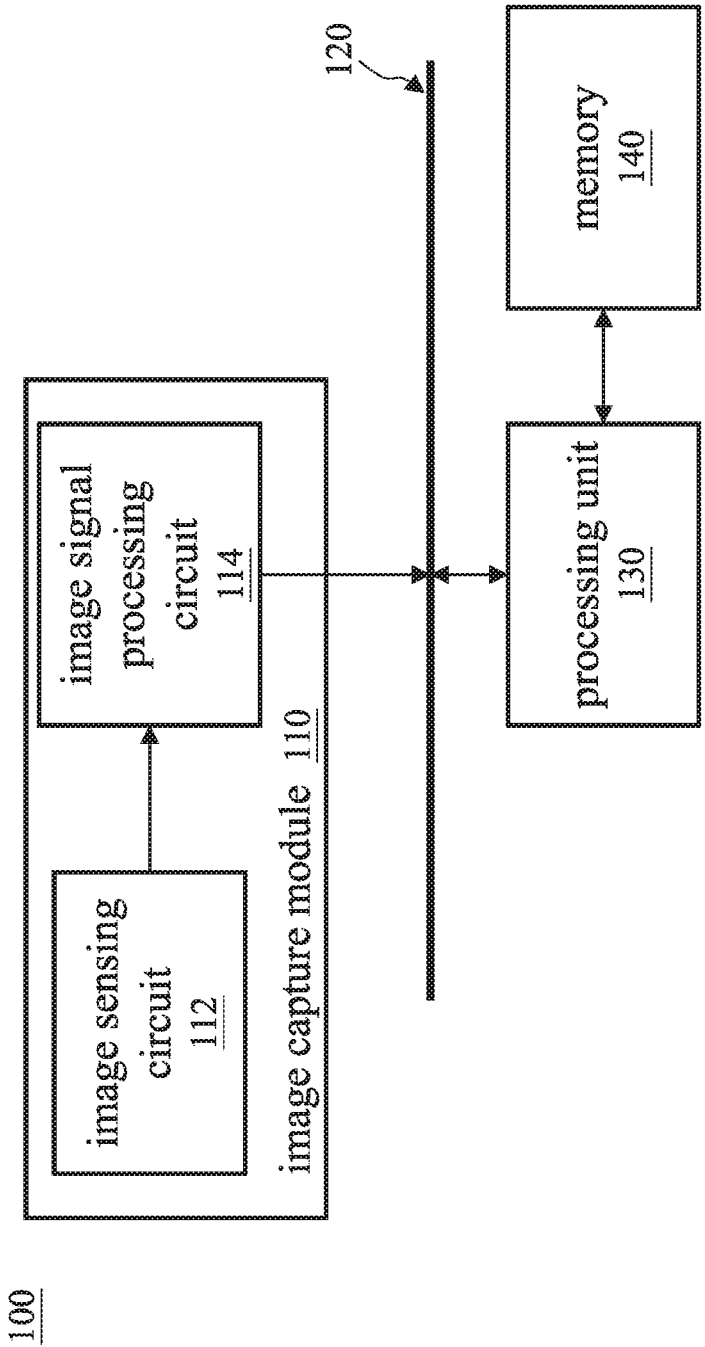
FIG. 1 illustrates an electronic device with an image capture function.

FIG. 1 is an electronic device with an image capture function. The electronic device 100 includes an image capture module 110, a bus 120, a processing unit 130, and a memory 140. The image capture module 110 includes an image sensing circuit 112 and an image signal processing circuit 114. The image sensing circuit 112 is, for example, a charge coupled device (CCD) or a complementary metal oxide semiconductor (CMOS) configured to sense an image of an object and generate an image signal. The image signal processing circuit 114 corrects and compensates the image signal to generate the original pixels of the image. The image capture module 110 communicates with the processing unit 130 through the bus 120. In one embodiment, the bus 120 is a universal serial bus (USB), which means that the data transmission between the image capture module 110 and the processing unit 130 conforms to the USB transmission specification. The processing unit 130 stores multiple pixel data of one picture in the memory 140. The memory 140 also stores codes or program instructions. The processing unit 130 executes the codes or program instructions to realize the functions of the electronic device 100 and perform the image processing method of the present invention.

A picture generally includes multiple horizontal lines. The number of sets of pixel data concurrently stored in the memory 140 is greater than the number of pixels in one horizontal line. Taking the RGB color space as an example, a set of pixel data of one pixel includes three values representing red color (R), green color (G), and blue color (B). Assuming that one picture includes N horizontal lines and each horizontal line contains M pixels, the number of sets of pixel data stored in the memory 140 at the same time is greater than M. In one embodiment, the memory 140 concurrently stores pixel data of all pixels of an entire picture, that is, the memory 140 stores N×M sets of pixel data at the same time. In addition to the RGB color space, the present invention is also applicable to other color spaces (such as YUV), grayscale, and the RAW format.

TNR can effectively filter out noises to obtain a clear and realistic image without damaging the image details. However, if a certain region in the picture has a brightness change, performing TNR on that region will cause image distortion of moving ghosting in that region. Therefore, when the brightness in the region changes, the present invention stops performing the TNR operation in the region. On the other hand, in order to avoid the poor visual perception caused by sudden occurrence of noises as the result of the suspension of the TNR operation and to maintain the consistency of noise reduction in a region in which the TNR operation is suspended, the present invention performs the spatial noise reduction (SNR) operation in that region.

Figure 2:
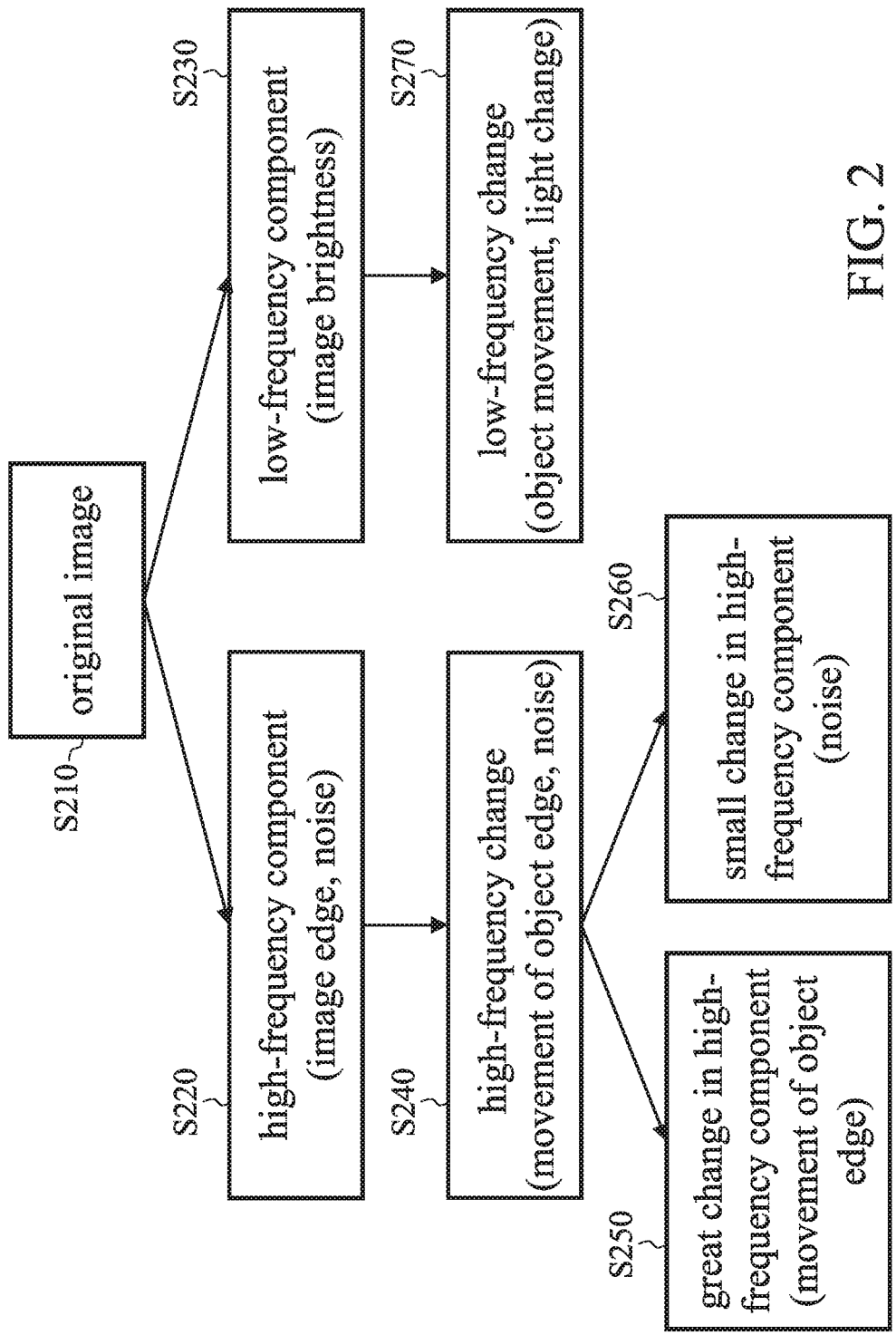
FIG. 2 illustrates a schematic diagram of separately processing a high-frequency component and a low-frequency component of an image according to the present invention.

FIG. 2 is a schematic diagram of separately processing a high-frequency component and a low-frequency component of an image according to the present invention. In order to prevent the TNR effect from being weakened by noise-triggered misjudgments, after obtaining the original image (step S210), the present invention separately processes the high-frequency component and the low-frequency component of the original image (steps S220 and S230). The low-frequency component corresponds to the image brightness, and the high-frequency component corresponds to the image edges and noises. There are two typical reasons for the image brightness change: object movement and light change. The movement of an object includes both a low-frequency change (brightness change caused by the movement) (step S270) and a high-frequency change (movement of edges of an object) (step S240), and the light change is mainly a low-frequency change (brightness change) (step S270). Then, the movement of object edge is distinguished from noise according to the magnitude of the high-frequency change (steps S250 and S260). The magnitude of the high-frequency change due to the movement of object edge is usually greater than the magnitude of the high-frequency change due to noise.

Figure 3:
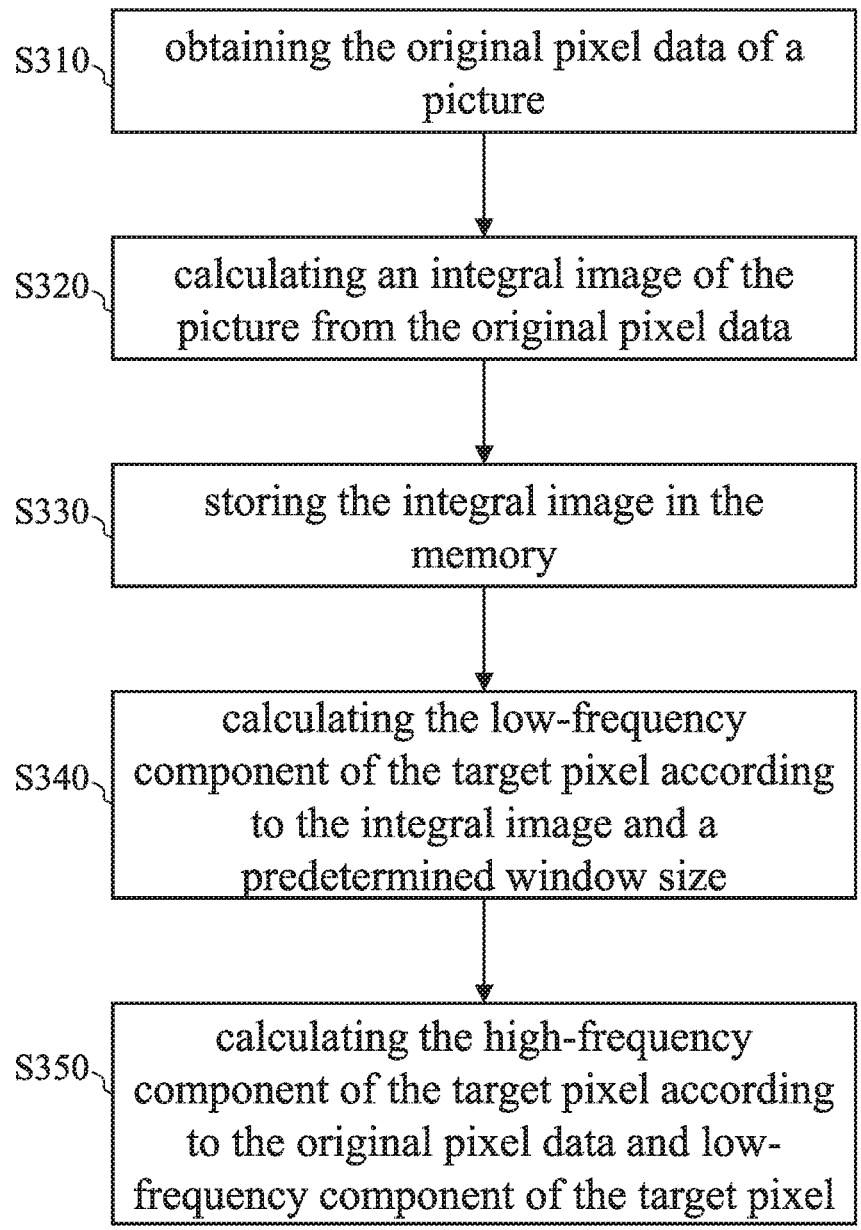
FIG. 3 illustrates a flow chart of obtaining the high-frequency component and low-frequency component of a target pixel according to the present invention.

FIG. 3 is a flow chart of obtaining the high-frequency component and low-frequency component of a target pixel according to the present invention. First, the processing unit 130 reads the original pixel data of the picture from the memory 140 (step S310), and then the processing unit 130 calculates an integral image of the picture based on the original pixel data (step S320). FIG. 4 shows the relationship between the original image that contains the original pixel data and the integral image that contains the integral image data. The calculation of the integral image based on the original image is well-known to a person having ordinary skill in the art and omitted for brevity. After calculating the integral image of the picture, the processing unit 130 stores the integral image in the memory 140 (step S330). Next, the processing unit 130 calculates the low-frequency component and the high-frequency component of the target pixel according to the integral image data and a predetermined window size (steps S340 and S350). More specifically, assuming that the target pixel is in the center of the image (represented by slanted lines) and the window size is 3×3 (corresponding to the thick black box in FIG. 4), when the processing unit 130 calculates the low-frequency component of the target pixel according to the integral image data, the calculation can be exemplified in equation (1).

$$(61-17-6+2)/9=4.44\approx4 \quad (1)$$

Equation (1) is an example of an average low-pass filter that contains three addition/subtraction operations and one divide operation. In comparison, when the average low-pass filter operation is performed on the original image to calculate the low-frequency component of the target pixel, the calculation is exemplified in Equation (2).

$$(5+9+5+7+4+7+2+0+1)/9=4.44 \quad 4 \quad (2)$$

Equation (2) contains eight addition operations and one divide operation. Obviously, using the integral image for average low-pass filtering the image (i.e., obtaining the low-frequency component) can greatly reduce the computational complexity of the processing unit 130. This advantage becomes more obvious when the predetermined window is greater (i.e., more reliable low-frequency component can be obtained). After obtaining the low-frequency component, the processing unit 130 subtracts the low-frequency component from the original pixel data of the target pixel to obtain the high-frequency component of the target pixel (step S350).

After obtaining the high-frequency component and low-frequency component of the target pixel, the processing unit 130 may then determine, based on FIG. 2, whether object movement, light change, movement of object edge, or noise is present in the region in which the target pixel is located. The change in the high-frequency component (or low-frequency component) can be determined by calculating the degree of similarity of the high-frequency component (or low-frequency component) between the current picture and the previous picture (e.g., calculating the absolute difference between the two).

Because spatial filtering is essentially average low-pass filtering, in one embodiment, the processing unit 130 may directly use the low-frequency component obtained in step S340 as the outcome of the spatial filtering, which further reduces the amount of computation of the processing unit 130. The processing unit 130 also performs temporal filtering on the target pixel. The operation of temporal filtering is well-known to a person having ordinary skill in the art and omitted for brevity.

Figure 5:
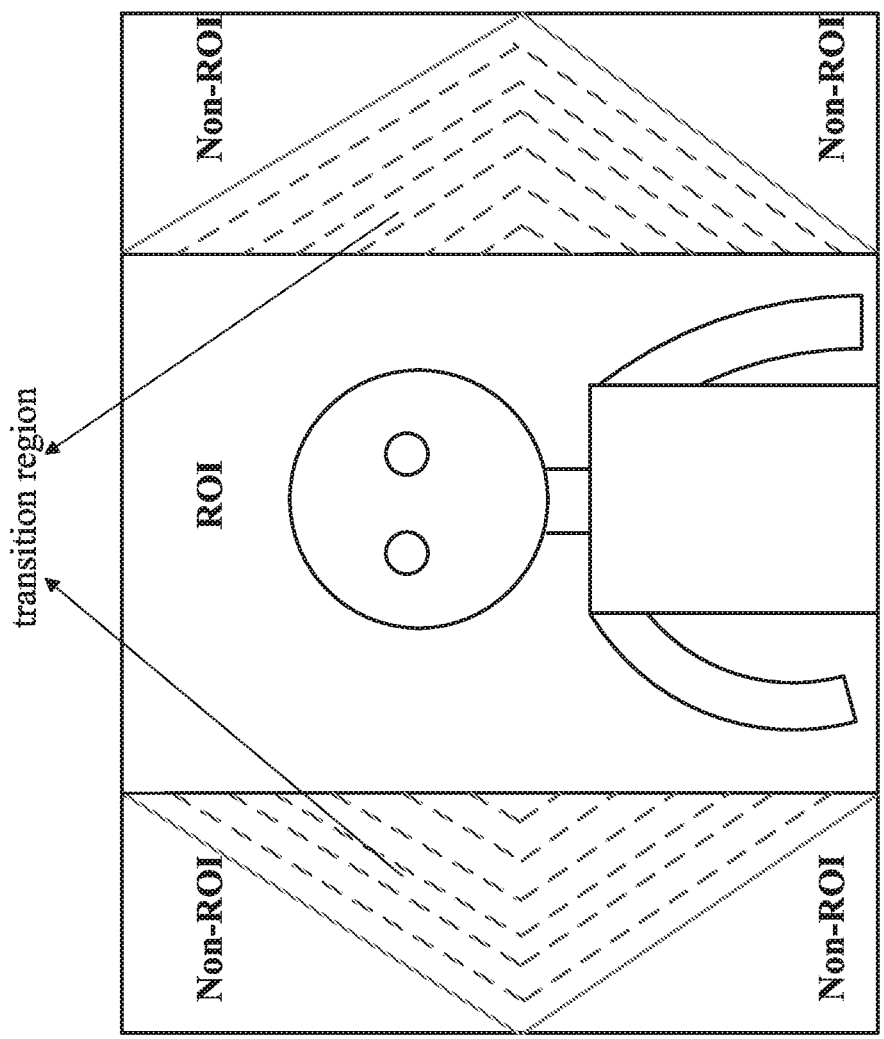
FIG. 5 illustrates a schematic diagram of dividing a picture into multiple regions according to the present invention.

In order to further reduce the amount of computation of the processing unit 130, the present invention divides the picture into multiple regions, and then employs different filtering mechanisms for different regions. FIG. 5 is a schematic diagram of dividing a picture into multiple regions according to the present invention. At least three different kinds of regions are included: a region of interest (marked by "ROI"), a region of non-interest (marked by "Non-ROI"), and a transition region between the two. The region of interest and region of non-interest do not overlap. In this example, the image capture module 110 captures the user's image (e.g., during a video call); in this case, the central region of the picture is the region of interest while the four corners of the picture are regions of non-interest. The transition region may be triangular or in other shapes. Typically, the four corners of the picture (i.e., the regions of non-interest in this example) tend to contain noises, and the central region of the picture (i.e., the region of interest in this example) tends to have image changes (e.g., user moving, gesturing, etc.)

Figure 6:
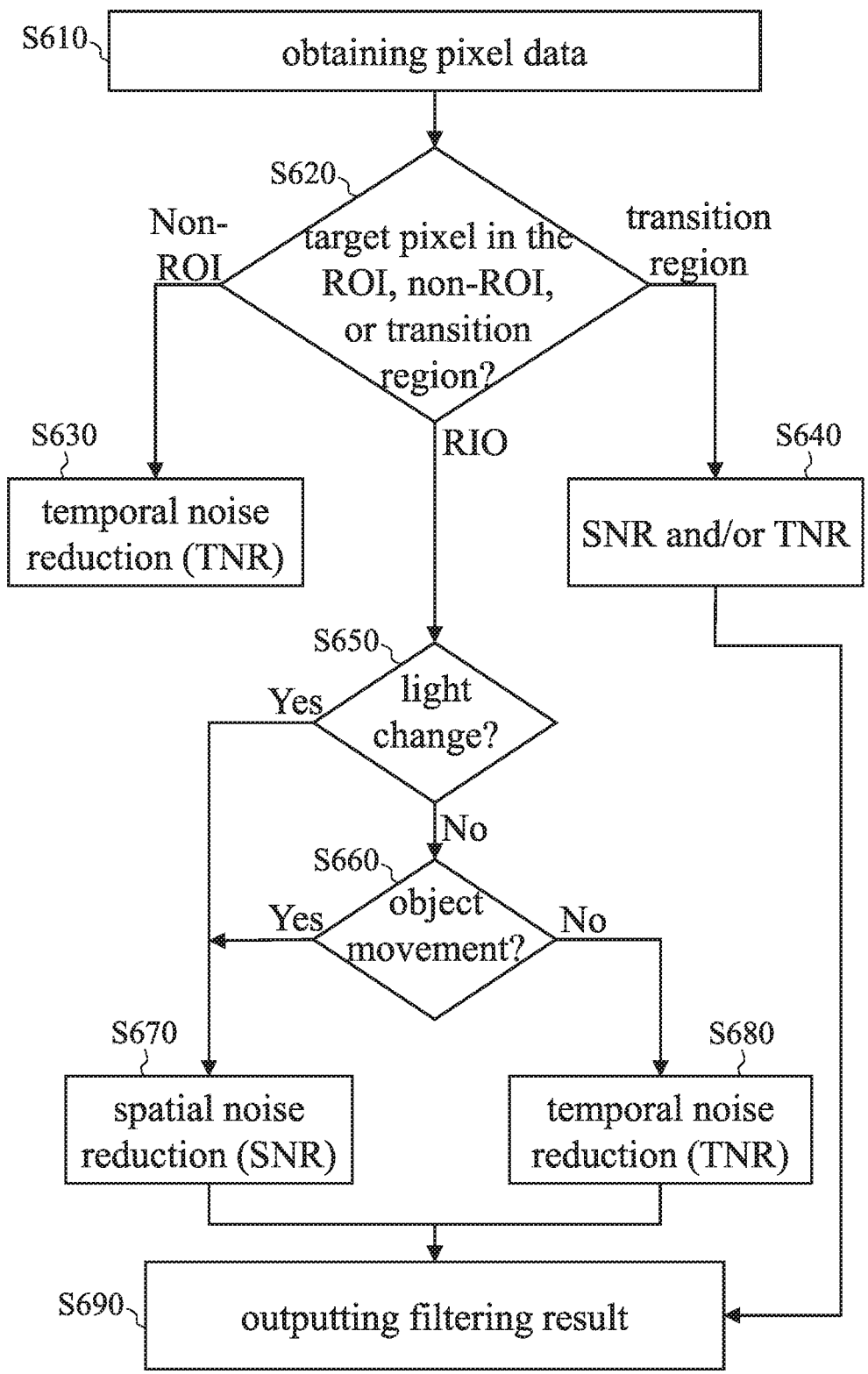
FIG. 6 illustrates a flow chart of an image processing method according to an embodiment of the present invention.

FIG. 6 is a flow chart of an image processing method according to an embodiment of the present invention. First, the processing unit 130 reads the pixel data from the memory 140 (step S610), and then determines whether the target pixel is in the region of interest, region of non-interest, or transition region according to the pre-defined regions (step S620). When the target pixel is in the region of non-interest, the processing unit 130 performs TNR on the image to effectively eliminate noise in the region of non-interest (step S630). When the target pixel is in the region of interest, the processing unit 130 detects whether light change occurs (step S650) and object movement occurs (step S660) in the location of the target pixel. As described above, light change and object movement are highly associated with changes in the high-frequency component and low-frequency component of the image; thus, the flow of FIG. 3 can be utilized to obtain the low-frequency component and high-frequency component of the target pixel for further analysis. Ways to obtain the low-frequency component and high-frequency component of the target pixel are not limited to the flow of FIG. 3. As mentioned above, object movement includes both low-frequency and high-frequency changes whereas light change is primarily low-frequency change. That is, when the change in the low-frequency component is greater than a first threshold and the change in the high-frequency component is not greater than a second threshold, an occurrence of light change in the image is implicated (step S650 being positive); on the other hand, when the change in the low-frequency component is greater than the first threshold value and the change in the high-frequency component is greater than the second threshold value, an occurrence of object movement in the image is implicated (step S660 being positive); in other cases, there is no light change and no object movement in the image.

When any of light change and object movement occurs (i.e., the image brightness changes), that is, when the low-frequency component of the target pixel changes (i.e., any of step S650 and step S660 is positive), the processing unit 130 performs SNR on the target pixel (step S670). When light change or object movement occurs, performing temporal filtering on the image may probably cause image distortions such as ghosting and dragging. Therefore, spatial filtering is instead performed on the image to reduce noise, so as to avoid ghosting and dragging. In one embodiment, if the flow of FIG. 3 has already been executed, step S670 may directly use the low-frequency component of the target pixel (obtained in step S340) as the filtering result of spatial filtering, which reduces the amount of computation of the processing unit 130. In one embodiment, the processing unit 130 may selectively calculate a weighted average of the spatial filtering result ($P_{SNR}$) and the target pixel's original pixel value ($P_{IN}$) according to Equation (3) ($0 \leq \alpha \leq 1$) to obtain a final filtering result ($P_{out}$).

$$P_{out}=\alpha \cdot P_{SNR}+(1-\alpha) \cdot P_{IN} \quad (3)$$

The intensity of SNR can be controlled by adjusting the weighted average coefficient $\alpha$. The greater the $\alpha$ (i.e., the stronger the intensity of SNR), the more blurred the image. In the case where the TNR operation is not performed due to the brightness change, when the image is severely affected by noise, the SNR operation is usually enhanced to keep the consistency of noise reduction of the picture with α being set close to or equal to 1 (i.e., $P_{out}=P_{SNR}$); when the image is less affected by noise, α can be lowered to prevent the brightness changing region from becoming too blurred due to SNR. Referring to FIG. 6, if neither light change nor object movement occurs in the location of the target pixel, the processing unit 130 performs TNR on the target pixel to effectively reduce noise. (Step S680). In brief, according to the low-frequency component of the target pixel, steps S650 and S660 determine to perform one of the following operations on the target pixel: (1) pure SNR (one embodiment of step S670); (2) pure TNR (step S680); or (3) SNR as well as calculation of weighted average of the SNR result and the original pixel value (another embodiment of step S670). After completing steps S670 and S680, the processing unit 130 outputs the filtering result (step S690).

In the case where the target pixel is in the transition region, the processing unit 130 performs SNR and/or TNR on the target pixel (step S640). In one embodiment, the processing unit 130 can directly select one of SNR and TNR to filter the target pixel. In another embodiment, in order to avoid discontinuousness of the image, the processing unit 130 performs both SNR and TNR on the target pixel and mixes the results of the two operations to obtain a final filtering result. For example, the processing unit 130 may calculate the weighted average of the two operation results according to Equation (4):

$$P_{out}=\beta \cdot P_{TNR}(1-\beta) \cdot P_{SNR} \qquad (4)$$

$P_{out}$ is the final filtering result, $P_{TNR}$ is the result of temporal filtering, $P_{SNR}$ is the result of spatial filtering, and β is the weighted average coefficient (0≤β≤1). When the position of the target pixel is closer to the region of non-interest, β can be set closer to 1. Similarly, after step S640 is completed, the processing unit 130 outputs the filtering result (step S690). There is not limitation on the size of the window used in the above steps S630, S640, S670 and S680, and the window size used in each step may be the same or different.

In one embodiment, the software-based image processing method described above is completed by the processing unit 130 while executing a driver of the electronic device 100. Completing the method during the execution of the driver means that when executing the image processing method of the present invention, the processing unit 130 can directly obtain the pixel data from the image capture module 110 (transmitted through the bus 120) and then store the pixel data in the memory 140. In comparison, in the case where the image processing method of the present invention is completed by the processing unit 130 while executing an application of the electronic device 100, the processing unit 130 cannot directly obtain the image data from the image capture module 110, but reads the pixel data that have been stored in the memory 140 and have been processed by the driver and/or other applications.

Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention. The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device comprising:
    a memory configured to store a plurality of program instructions;
    a processing unit coupled to the memory and configured to execute the program instructions to complete following steps while executing a driver:
        (a) receiving pixel data of a plurality of pixels of a picture from an image capture device through a universal serial bus;
        (b) storing the pixel data of the pixels in the memory, a number of the pixels in the memory being greater than a number of pixels in one horizontal line of the picture;
        (c) determining a first region and a second region in the picture;
        (d) determining whether a target pixel is in the first region or the second region;
        (e) performing following steps when the target pixel is in the first region:
            (e1) performing an integral image operation on the pixel data to obtain an integral image data;
            (e2) storing the integral image data in the memory;
            (e3) using the integral image data to calculate a low-frequency component of the target pixel of the picture; and
            (e4) based on the low-frequency component, selectively performing a temporal noise reduction operation on the target pixel; and
        (f) performing the temporal noise reduction operation on the target pixel when the target pixel is in the second region.

2. The electronic device of claim 1, wherein the first region and the second region do not overlap, and the processing unit further executes the program instructions to complete following steps:
    (g) determining a third region in the picture, the third region being different from the first region and the second region; and
    (h) performing the temporal noise reduction operation and/or a spatial noise reduction operation on the target pixel when the target pixel is in the third region.

3. The electronic device of claim 1, wherein step (e4) comprises:
    determining a magnitude of brightness change of the picture according to the low-frequency component, and, based on the magnitude of brightness change, selectively performing the temporal noise reduction operation on the target pixel.

4. The electronic device of claim 1, wherein step (e) further comprises:
    (e5) performing a spatial noise reduction operation on the target pixel when step (e4) does not perform the temporal noise reduction operation.

5. The electronic device of claim 4, wherein step (e) further comprises:
    (e6) calculating a weighted average of a result of the spatial noise reduction operation and the pixel data of the target pixel.

6. An electronic device comprising:
    a memory configured to store a plurality of program instructions;
    a processing unit coupled to the memory and configured to execute the program instructions to complete following steps:

(a) storing pixel data of a plurality of pixels of a picture in the memory, a number of the pixels in the memory being greater than a number of pixels in one horizontal line of the picture;
(b) performing an integral image operation on the pixel data to obtain an integral image data;
(c) storing the integral image data in the memory;
(d) using the integral image data to calculate a low-frequency component of a target pixel of the picture; and
(e) based on the low-frequency component, selectively performing a temporal noise reduction operation on the target pixel.

7. The electronic device of claim 6, wherein the processing unit further executes the program instructions to complete following steps before step (b):
(f) determining a first region and a second region in the picture, the first region and the second region not overlapping;
(g) determining whether the target pixel is in the first region or the second region;
(h) performing step (b) to step (e) when the target pixel is in the first region; and
(i) directly performing the temporal noise reduction operation on the target pixel without performing step (b) to step (e) when the target pixel is in the second region.

8. The electronic device of claim 7, wherein the processing unit further executes the program instructions to complete following steps:
(j) determining a third region in the picture, the third region being different from the first region and the second region; and
(k) performing the temporal noise reduction operation and/or a spatial noise reduction operation on the target pixel when the target pixel is in the third region.

9. The electronic device of claim 6, wherein step (e) comprises:
(e1) determining a magnitude of brightness change of the picture according to the low-frequency component, and, based on the magnitude of brightness change, selectively performing the temporal noise reduction operation on the target pixel.

10. The electronic device of claim 6, wherein the processing unit further executes the program instructions to complete following steps:
(f) performing a spatial noise reduction operation on the target pixel when step (e) does not perform the temporal noise reduction operation.

11. The electronic device of claim 10, wherein step (f) comprises:
(f1) using the low-frequency component as an outcome of the spatial noise reduction operation.

12. The electronic device of claim 10, wherein the processing unit further executes the program instructions to complete following steps:
(g) calculating a weighted average of a result of the spatial noise reduction operation and the pixel data of the target pixel.

13. The electronic device of claim 6, wherein the electronic device further comprises an image capture device, the image capture device and the processing unit transmit data through a universal serial bus, and the electronic device executes the program instructions to complete the foregoing steps and following steps while executing a driver:

(f) receiving the pixel data of the pixels from the image capture device through the universal serial bus before the pixel data of the pixels are concurrently stored in the memory.

14. An electronic device comprising:
a memory configured to store a plurality of program instructions;
a processing unit coupled to the memory and configured to execute the program instructions to complete following steps:
(a) storing pixel data of a plurality of pixels of a picture in the memory, number of the pixels in the memory being greater than a number of pixels in one horizontal line of the picture;
(b) determining a first region and a second region in the picture, the first region and the second region not overlapping;
(c) determining whether a target pixel is in the first region or the second region;
(d) based on a low-frequency component of the target pixel, selectively performing a temporal noise reduction operation on the target pixel when the target pixel is in the first region; and
(e) performing the temporal noise reduction operation on the target pixel when the target pixel is in the second region.

15. The electronic device of claim 14, wherein the processing unit further executes the program instructions to complete following steps:
(f) determining a third region in the picture, the third region being different from the first region and the second region; and
(g) performing the temporal noise reduction operation and/or a spatial noise reduction operation on the target pixel when the target pixel is in the third region.

16. The electronic device of claim 14, wherein step (d) comprises:
(d1) determining a magnitude of brightness change of the picture according to the low-frequency component, and, based on the magnitude of brightness change, selectively performing the temporal noise reduction operation on the target pixel.

17. The electronic device of claim 14, wherein the processing unit further executes the program instructions to complete following steps:
(f) performing a spatial noise reduction operation on the target pixel when step (d) does not perform the temporal noise reduction operation.

18. The electronic device of claim 17, wherein step (f) comprises:
(f1) using the low-frequency component as an outcome of the spatial noise reduction operation.

19. The electronic device of claim 17, wherein the processing unit further executes the program instructions to complete following steps:
(g) calculating a weighted average of a result of the spatial noise reduction operation and the pixel data of the target pixel.

20. The electronic device of claim 14, wherein the electronic device further comprises an image capture device, the image capture device and the processing unit transmit data through a universal serial bus, and the electronic device executes the program instructions to complete the foregoing steps and following steps while executing a driver:

(f) receiving the pixel data of the pixels from the image capture device through the universal serial bus before the pixel data of the pixels are concurrently stored in the memory.

* * * * *